(12) United States Patent
Whitehouse

(10) Patent No.: US 8,229,961 B2
(45) Date of Patent: Jul. 24, 2012

(54) MANAGEMENT OF LATENCY AND THROUGHPUT IN A CLUSTER FILE SYSTEM

(75) Inventor: Steven John Whitehouse, Swansea (GB)

(73) Assignee: Red Hat, Inc., Raleigh, NC (US)

( * ) Notice: Subject to any disclaimer, the term of this patent is extended or adjusted under 35 U.S.C. 154(b) by 149 days.

(21) Appl. No.: 12/774,601

(22) Filed: May 5, 2010

(65) Prior Publication Data

US 2011/0276542 A1 Nov. 10, 2011

(51) Int. Cl.
*G06F 17/00* (2006.01)

(52) U.S. Cl. ......... 707/791; 707/802; 707/822; 707/828

(58) Field of Classification Search ........... 707/600–831
See application file for complete search history.

(56) References Cited

U.S. PATENT DOCUMENTS

| | | | |
|---|---|---|---|
| 5,117,352 | A | 5/1992 | Falek |
| 5,553,239 | A | 9/1996 | Heath et al. |
| 5,596,754 | A | 1/1997 | Lomet |
| 5,758,345 | A | 5/1998 | Wang |
| 5,828,876 | A | 10/1998 | Fish et al. |
| 6,108,654 | A | 8/2000 | Chan et al. |
| 6,493,804 | B1 | 12/2002 | Soltis et al. |
| 6,697,901 | B1 | 2/2004 | Chan |
| 7,200,623 | B2 | 4/2007 | Chandrasekaran et al. |
| 7,447,693 | B2 | 11/2008 | Wilding et al. |
| 7,484,048 | B2 | 1/2009 | Whitehouse |
| 7,702,640 | B1 * | 4/2010 | Vermeulen et al. ........ 707/999.1 |
| 2003/0027487 | A1 | 2/2003 | Haug |
| 2003/0227487 | A1 | 12/2003 | Hugh |
| 2006/0167921 | A1 | 7/2006 | Grebus et al. |
| 2006/0212453 | A1 | 9/2006 | Eshel et al. |
| 2008/0320097 | A1 | 12/2008 | Sawicki et al. |
| 2009/0055348 | A1 | 2/2009 | Wilding et al. |

OTHER PUBLICATIONS

Kenah, Lawrence J., et al., "VAX/VMS Internals and Data Structures", Bedford, Massachusetts: Digital Press, 1984, pp. 244-263.
Schimmel, Curt, "UNIX Systems for Modern Architectures", Addison-Wesley Professional Computing Series, Reading, Massachusetts: Addison-Wesley Publishing Company, 1994.
Shah, Jay, "VAXclusters: Architecture, Programming, and Management", New York: McGraw-Hill, Inc., 1991, pp. 57-99.
"Distributed Lock Manager", accessed at: http://en.wikipedia.org/w/index.php?title=Distributed_lock_manager on Apr. 22, 2010, last updated Feb. 25, 2010, 4 pages.

(Continued)

*Primary Examiner* — Isaac M Woo
(74) *Attorney, Agent, or Firm* — Lowenstein Sandler PC

(57) ABSTRACT

Some embodiments of a system and a method to detect contention for resource in a cluster file system have been presented. For instance, a processing device may measure time spent performing actual operations by each of a set of nodes in a cluster file system when a respective node holds a lock on a resource and time spent performing overhead operations by the set of nodes without synchronization of clocks across the cluster file system. Then the processing device can determine latency and throughput of the cluster file system based on the time spent performing actual operations and the time spent performing overhead operations.

21 Claims, 4 Drawing Sheets

OTHER PUBLICATIONS

Adams, Steve, "Oracle8i Internal Services: for Waits, Latches, "Global File System", accessed at: http://en.wikipedia.org/w/index.php?title=Global_File_System on Apr. 22, 2010, last updated Apr. 4, 2010, 7 pages. Locks, and Memory", O'Reilly & Associates, Sebastapol, California, 1999, pp. 37-80.

"Red Hat Global File System", accessed at: http://redhat.com/whitepapers/rha/gfs/GFS_INS0032US.pdf on May 5, 2010, published 2004, 4 pages.

"Kernel Asynchronous I/O (AIO) Support for Linux", accessed at: http://lse.sourceforge.net/io/aio.html on May 5, 2010, published 2005, 2 pages.

Drepper, Ulrich, "Futexes Are Tricky", accessed at: http://people.redhat.com/drepper/futex.pdf on May 5, 2010, published Aug. 1, 2009, 12 pages.

International Preliminary Report on Patentability and Written Opinion for related application PCT/US06/15959, mailed Mar. 14, 2008, 8 pages.

* cited by examiner

MANAGEMENT OF LATENCY AND THROUGHPUT IN A CLUSTER FILE SYSTEM

RELATED APPLICATION

This application is related to concurrently filed U.S. patent application Ser. No. 12/774,591, filed on May 5, 2010, which is herein incorporated by reference in its entirety.

TECHNICAL FIELD

Embodiments of the present invention relate to cluster file systems, and more specifically to managing latency and throughput in cluster file systems.

BACKGROUND

Conventionally, a distributed file system, also referred to as a cluster file system, is a file system that allows access to resources (e.g., files) from multiple hosts sharing via a computer network. As nodes in the distributed file system can share resources, the nodes may also compete or contend for a particular resource. Currently, a lock manager is usually used in some conventional distributed file systems to arbitrate between nodes and provide shared or exclusive access to each resource. In general, there is no mechanism in place to detect contention beyond degrading response times of file system operations, which may also be caused by other bottlenecks in the system. A conventional distributed file system may eventually become aware of possible resource contention between two or more nodes after a long wait.

Resource contention in a distributed file system is an important problem because such contention normally results in very poor performance due to the amount of time required to grant locks and send callbacks by the lock manager and the associated set up and tear down time on each node, and the time for which the workload is blocked waiting for the lock, preventing workload from proceeding normally. Because of the lack of resource contention detection, it is generally difficult to manage latency and throughput in conventional distributed file systems.

BRIEF DESCRIPTION OF THE DRAWINGS

The present invention is illustrated by way of example, and not by way of limitation, in the figures of the accompanying drawings and in which.

DETAILED DESCRIPTION

Figure 1:
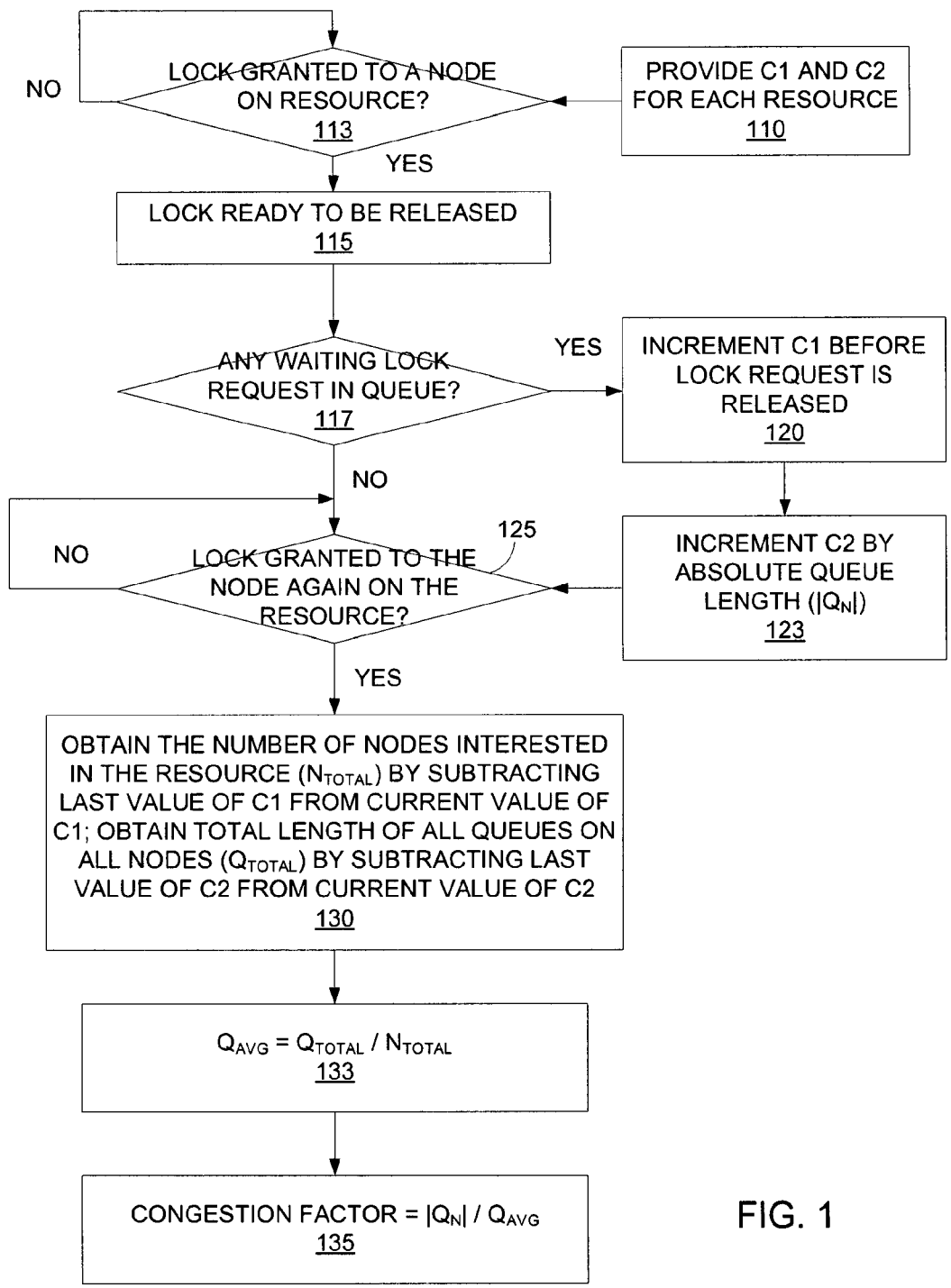
FIG. 1 illustrates a flow diagram of one embodiment of a method to detect resource contention in a cluster file system.

Described herein are some embodiments of a method, an apparatus, and a system to manage latency and throughput in a cluster file system, also referred to as a distributed file system. In general, a distributed lock manager (DLM) (or simply referred to as a lock manager hereinafter) is usually used in order to arbitrate between nodes and provide shared or exclusive access to each resource in the cluster file system. A resource as used herein broadly refers to some entity to which shared access is controlled. Some examples of a resource include a file, a record, an area of a shared memory, a database, etc. One issue often faced in a cluster file system is how to detect and handle contention on resources. This is an important problem because such contention normally results in very poor performance due to the amount of time required to grant and send callbacks by the lock manager and the associated set up and tear down time on each node, and the time for which the workload is blocked waiting for the lock, preventing the workload from proceeding normally.

In some embodiments, resource contention is automatically detected in a cluster file system, and appropriate action to prevent and/or to mitigate performance problems can be taken. In other words, an optimum solution to increase the throughput of the cluster can be found by computing the optimal time for each node in the cluster file system to hold a lock request on a particular resource. Note that in the following discussion, it is assumed that all nodes in the cluster file system cooperate with each other, and that there are no nodes injecting incorrect information into the system. In some embodiments, there is a queuing system for lock requests, which is independent of the DLM, within each node. Furthermore, lock requests may be serviced in the order in which the lock requests are queued. This is true for both of the local request queue on each node and also of the DLM itself since the queue is on a DLM lock master node in that case. Details of some embodiments of how to detect contention for resource in a cluster file system are described below.

Furthermore, accurate resource contention detection can improve management of latency and throughput in a cluster file system. In some embodiments, nodes in a cluster file system can keep track of how much time is spent in performing the actual operations and how much time is spent on the overhead operations. For instance, a processing device running on a node may measure time spent performing actual operations by each of a set of nodes in a cluster file system when a respective node holds a lock on a resource and time spent performing overhead operations by the set of nodes without synchronization of clocks across the cluster file system. Then the processing device can determine latency and throughput of the cluster file system based on the time spent performing actual operations and the time spent performing overhead operations. Details of some embodiments of how to manage latency and throughput in a cluster file system are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "tracking " or "incrementing" or "adjusting" or "determining" or "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates a flow diagram of one embodiment of a method to detect resource contention in a cluster file system. The method may be performed by processing logic that may comprise hardware (e.g., circuitry, dedicated logic, programmable logic, microcode, etc.), software (such as instructions run on a processing device), firmware, or a combination thereof For instance, the computing system 400 illustrated in FIG. 4 may perform at least part of the method in some embodiments.

In one example, there is a set of k nodes N ={1, 2, . . . , k}which is interested in some resource in the cluster file system. Each node may be a computer system, such as the exemplary computer system illustrated in FIG. 4, or a virtual node being emulated upon such a physical system. Note that in different embodiments, there may be numerous resources in the cluster file system, which are independent and behave in a similar manner. However, to simplify the following discussion, only a single resource is considered unless otherwise stated.

Each node in the cluster file system has a set of l processes running on it, Pn ={$p_1, p_2, \ldots, p_l$}. Each process may queue lock requests to use a particular resource from time to time. In the current example, it is assumed that each process may queue a maximum of one lock request at a time, wait until that request is granted, perform some action upon the locked resource, and then send a notification that it has finished with the resource.

In some embodiments, the cluster file system has various lock modes. In the current example, only two lock modes, namely, read lock mode and write lock mode, are considered for simplicity. A read lock request from one process can be granted at the same time as a read lock request from any other process. Read lock requests prevent any write lock requests from being granted. A write lock request from one process is an exclusive lock on a resource. Only one can be granted at any one time. In another model, processes within a single node are allowed to share a distributed write lock provided they have their own locking locally. One of skilled in the art would readily appreciate from the current disclosure that the techniques disclosed herein can be applied to the above model.

In some embodiments, there is a queue of lock requests on each node of the cluster file system, and that at any one time, only one (if it is a write lock) or several (if they are read locks) may be granted. Lock requests are added to the queue when a process sends one and they are queued in order of arrival until they can be granted. The request queue on a node can be modeled as an ordered set $Q_n = \{r_1, r_2, \ldots, r_j\}$, where the queue length is $|Q_n|=j$. The maximum queue length in the current example is l.

The first measure of congestion available is the request queue length on each node, $|Q_n|$, where n is any integer from the set N. In some embodiments, the average queue length on all nodes in the set is computed. Using the average queue length, a relative congestion factor for each node can be computed as discussed below.

In some embodiments, two global distributed counters (C1 and C2) are provided for each resource (processing block 110). The two counters are used to track the number of nodes interested in the respective resource and the total length of all queues on all nodes. Processing logic checks if there is any lock granted to a node on the resource (processing block 113). If none, then processing logic remains in processing block 113. Otherwise, processing logic checks if there is a waiting lock request in the node's request queue at the point where a previous request is being released (processing block 115). This is because not all nodes may be congested at all times. If there is no lock request waiting, then processing logic transitions to processing block 125 without incrementing either counter. Otherwise, processing logic increments the first counter by one (1) before the lock request is released (processing block 120) and increments the second counter by the absolute queue length $|Q_n|$ (processing block 123). As such, the counters are not incremented unless there is a waiting lock request in the node's request queue at the point where a previous request is being released.

When the node next receives a lock grant for that resource (processing block 125), processing logic can take the difference between the two counter values last time it had a lock on the resource and the current values (processing block 130). These two values are then, the number of nodes interested in the resource and the total length of all the queues on all nodes respectively.

Next, processing logic may divide the total queue length by the total number of nodes interested to obtain the average queue length (processing block 133). Finally, processing logic may divide the local queue length $|Q_n|$ by the average queue length to obtain a congestion factor for the node (processing block 135).

In some embodiments, the distributed counters may be implemented with a lock counter block (LCB). The LCB includes a number of counters, such as two for the above example, associated with each resource in the cluster file system. These counters are maintained by the lock master. The counter values can be read by a task when it receives a lock grant and atomically updated upon lock release. The task can update the counters atomically no matter what lock mode it has been holding. One way to implement the LCB is to use a lock value block (LVB) of a VAX-style DLM and add an extra flag to the LVB to indicate that the LVB is to be used as an LCB. Alternatively, a set of counters may be put into a separate part of the interface to implement the LCB. More details of some embodiments of a LCB are discussed below.

The congestion information represented by the two counters may also be used to trigger an alert or warning to a user and/or administrator of a cluster if the congestion goes above a predetermined threshold. As such, corrective action may be taken to reduce the congestion. In some embodiments, the congestion information may also be used to adjust relative lock hold times for each node, in order to ensure that the node with most work for a particular resource receives a greater share of the available time.

Another issue involved in managing congestion on shared resources is the trade off between throughput and latency. In some embodiments of a cluster file system, when a node receives a lock request grant, it usually has to perform some preparatory work, such as reading in an inode (which is a data structure storing information on a file system object, such as a file, a directory, etc.) from disk, before it can execute the operation for which the lock was requested (referred to as the "actual operations" hereinafter). When a callback is received from a remote node, there may be a considerable amount of work to be done in order to be in a position to release that lock. For cluster file systems that include a log flush, such work may include write back of both data and metadata (assuming that any modification of the resource has occurred) and invalidation of the cached data (if a shared lock on the resource cannot be kept). Both the preparatory work and the work performed between receiving the callback and releasing the lock are collectively referred to as overhead operations hereinafter.

Figure 2:
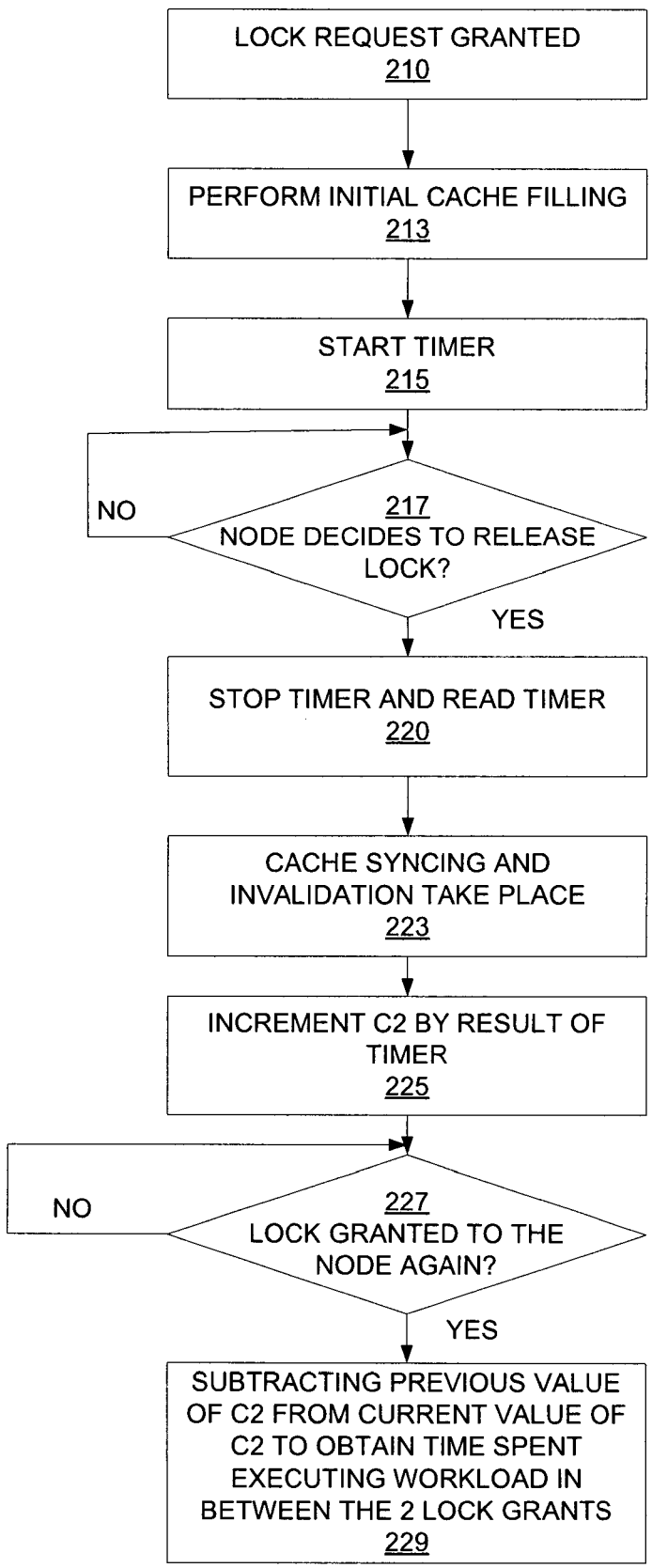
FIG. 2 shows a flowchart of one embodiment of a method to keep track of how much time is spent in performing the actual operations and how much time is spent on the overhead operations.

FIG. 2 shows a flowchart of one embodiment of a method to keep track of how much time is spent in performing the actual operations and how much time is spent on the overhead operations. The method may be performed by processing logic that may comprise hardware (e.g., circuitry, dedicated logic, programmable logic, microcode, etc.), software (such as instructions run on a processing device), firmware, or a combination thereof. For instance, the computing system 400 illustrated in FIG. 4 may perform at least part of the method in some embodiments.

In some embodiments, a process running on a node of the cluster file system receives a lock request grant (processing block 210). In response to the lock request grant, processing logic then performs the initial cache filling (processing block 213). After performing the initial cache filling, processing logic starts a timer (processing block 215). Then processing logic checks if the node decides to release the lock (processing block 217). If not, then processing logic remains in processing block 217. Otherwise, processing logic stops the timer and reads the value in the timer (processing block 220). Then processing logic performs cache synchronization and invalidation (processing block 223). In other words, the timer measures the amount of time taken to execute the workload of the actual operations.

In some embodiments, the result of the timer is added to a counter (also referred to as a time counter) (processing block 225). This counter may be the second counter in the LCB discussed above, whereas the first counter in the LCB remains being used to keep track of the number of interested nodes and is incremented once by each node when releasing a lock request if there are still requests remaining in that node's lock request queue. Note that the time counter is updated in the case that the node is not congested, unlike the first counter (which may be referred to as the node counter) in the LCB discussed above. This is to avoid missing out valid time spent on the workload in the case that the node is not congested, but the resource is congested.

Processing logic checks if there is any new lock request granted to the node again (processing block 227). If none, then processing logic remains in processing block 227). Otherwise, processing logic compute the difference between the value in the counter when the node last released the lock and the value when the node receives the lock request grant again (processing block 229). The difference is the amount of time spent executing the workload in that time interval.

In some embodiments, processing logic also keeps track of the elapsed time between when it released the lock request and a new lock grant was received. The difference between the two times is the overhead in transferring the lock between nodes.

Based on the ratio of the time spent performing the actual operations to the total time used, processing logic may send an alert or notification to the user or administrator. Furthermore, the information may also be used as part of a mitigation algorithm. By increasing the time for which an individual node may keep a lock on a resource, the ratio of time spent moving the lock between nodes to time spent actually executing the workload may be adjusted to a target level. This allows a trade off of latency against throughput to be set for the cluster file system.

In some embodiments, processing logic may also take some practical considerations into account by, such as, for example, setting default, minimum and maximum bounds on the computed time period in order to avoid any pathological cases.

In some embodiments, the methods illustrated in FIGS. 1 and 2 can be combined to compensate for unequal workloads across the nodes in the cluster file system. It can be implemented using three counters in the LCB since the first counter in each of the above two methods is common. In some embodiments, the time period computed in the method illustrated in FIG. 2 is used as the average time for which a node should hold a lock, and that time period may be adjusted on each individual node by multiplying by the queue length ratio computed using the method shown in FIG. 1. As such, unequal workloads across the nodes can be compensated.

Figure 3:
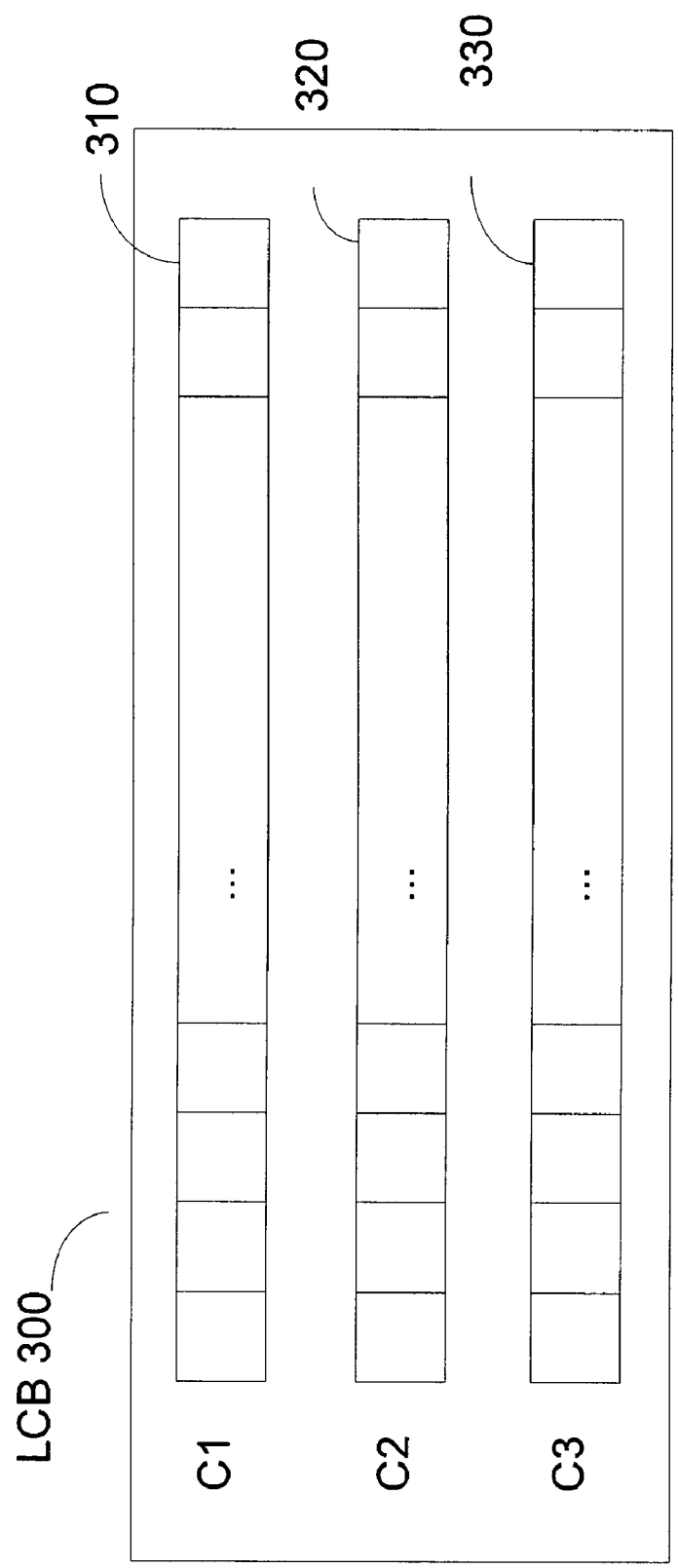
FIG. 3 illustrates one embodiment of a lock counter block (LCB).

FIG. 3 illustrates one embodiment of a lock counter block (LCB). The LCB is associated with a particular resource in a cluster file system, and is controlled by a lock master in the cluster file system. The LCB 300 includes three counters 310, 320, and 330. Each of the counters 310-330 is of 64 bits. Counters of other sizes (e.g., 32 bits) may be used in different embodiments. The counters 310-330 can be updated atomically on each lock release. The current value of the counters 310-330 is delivered on each lock request grant. The counters 310-330 are unsigned and can wrap at a certain point. Addition to the counters is thus modulo the maximum counter value. Comparison between the counter values and values stored on the nodes is also modulo the maximum counter value. In some embodiments, a subtraction operation may be implemented on the counters 310-330 as well.

In some embodiments, a recovery mechanism is provided for the LCB 300. Since a lock holder can change the counter value, the highest counter value (modulo the maximum counter value) can be chosen at recovery time if the lock master is no longer in the cluster. Alternatively, the counters could be reset to zero, since the next "round" of locking would reinitialize them.

Figure 4:
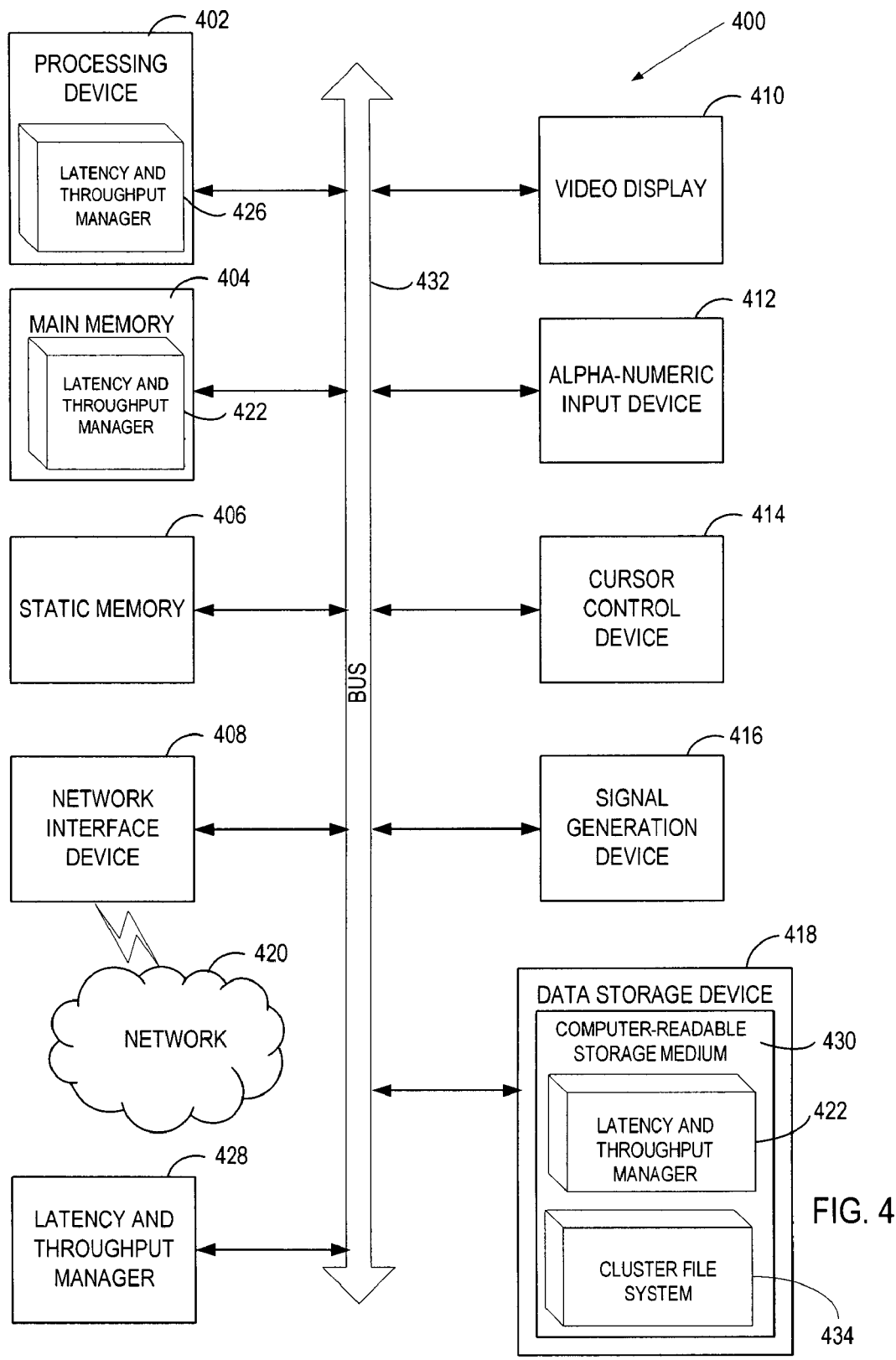
FIG. 4 illustrates a block diagram of an exemplary computing system.

FIG. 4 illustrates a diagrammdtic representation of a machine in the exemplary form of a computing system 400 within which a set of instructions, for causing the machine to perform any one or more of the methodologies discussed herein, may be executed. In some embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 432.

Processing device 402 represents one or more general-purpose processing devices such as a microprocessing device, a central processing unit, or the like. More particularly, the processing device may be complex instruction set computing (CISC) microprocessing device, reduced instruction set computing (RISC) microprocessing device, very long instruction word (VLIW) microprocessing device, or processing device implementing other instruction sets, or processing devices implementing a combination of instruction sets. Processing device 402 may also be one or more special-purpose processing devices such as an application specific integrated circuit (ASIC), a field programmable gate array (FPGA), a digital signal processing device (DSP), network processing device, or the like. The processing device 402 is configured to execute the latency and throughput manager 426 for performing the operations and steps discussed herein.

The computing system 400 may further include a network interface device 408. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., latency and throughput manager 422) embodying any one or more of the methodologies or functions described herein. The latency and throughput manager 422 may also reside, completely or at least partially, within the main memory 404 and/or within the processing device 402 during execution thereof by the computing system 400, the main memory 404 and the processing device 402 also constituting computer-accessible storage media. Data relating to the latency and throughput manager 422 may further be transmitted or received over a network 420 via the network interface device 408. In some embodiments, the data storage device 418 further includes a cluster file system 434, which may be accessible from other nodes of the cluster on an equal basis. This might be a single disk in a disk enclosure, a virtual RAM disk shared among virtual machines on a single host, a Redundant Array of Independent Disks (RAID) array, or some other form of storage device connected via a network or storage area network (SAN).

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The latency and throughput manager 428, components and other features described herein (for example, in relation to FIG. 2) can be implemented as discrete hardware components or integrated into the functionalities of hardware components, such as ASICS, FPGAs, DSPs, or similar devices. In addition, the latency and throughput manager 428 can be implemented as firmware or functional circuitries within hardware devices. Further, the latency and throughput manager 428 can be implemented in any combination of hardware devices and software components.

Thus, some embodiments of a system and a method to manage latency and throughput in a cluster file system have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    measuring, by a computing system, time spent performing actual operations by a node in a cluster file system while the node holds a lock on a resource;
    measuring, by the computing system, time spent performing overhead operations by the node without synchronization of clocks across the cluster file system; and
    determining, by the computing system, latency and throughput of the cluster file system based on the time spent performing actual operations and the time spent performing overhead operations.

2. The method of claim 1, further comprising: tracking the number of nodes in the cluster file system that are interested in the resource.

3. The method of claim 1, wherein measuring the time spent performing actual operations comprises:
    starting a timer after a lock request from the node is granted and after initial cache filling has been completed; and
    stopping the timer upon the node deciding to release the lock request, but before the lock request is actually released and before any overhead operations are executed.

4. The method of claim 1, further comprising: increasing a time for which the node can keep a lock on the resource to adjust a ratio between the latency and throughput.

5. The method of claim 1, further comprising:
    providing a first counter and a second counter, both the first and the second counters associated with the resource, wherein the first and the second counters can be updated regardless of a lock mode of the lock;
using the first counter to keep track of the number of nodes that are interested in the resource; and
using the second counter to measure the time spent performing actual operations and the time spent performing overhead operations.

6. The method of claim 1, further comprising: converting a lock value block (LVB) of the cluster file system to a lock counter block (LCB) to count in both read lock mode and write lock mode.

7. The method of claim 1, further comprising:
determining the number of nodes that are interested in the resource and a total queue length of all lock request queues on all nodes of the plurality of nodes;
determining an average queue length based on the number of nodes interested in the resource and the total queue length; and
adjusting a time interval during which the node can hold the lock based on the average queue length.

8. An apparatus comprising:
a network interface to communicably couple to a plurality of nodes of a cluster file system; and
a processing device coupled to the network interface to:
measure time spent performing actual operations by a node in the cluster file system while the node holds a lock on a resource,
measure time spent performing overhead operations by the node without synchronization of clocks across the cluster file system, and
determine latency and throughput of the cluster file system based on the time spent performing actual operations and the time spent performing overhead operations.

9. The apparatus of claim 8, wherein the processing device tracks the number of nodes in the cluster file system that are interested in the resource.

10. The apparatus of claim 8, further comprising:
a timer, wherein the processing device starts the timer after a lock request from the node is granted and after initial cache filling has been completed, and stops the timer upon the node deciding to release the lock request, but before the lock request is actually released.

11. The apparatus of claim 8, wherein the processing device increases a time for which the node can keep a lock on the resource to adjust a ratio between the latency and throughput.

12. The apparatus of claim 8, further comprising:
a first counter; and
a second counter, wherein both the first and the second counters are associated with the resource and can be updated regardless of a lock mode of the lock, and wherein the processing device is also to:
use the first counter to keep track of the number of nodes that are interested in the resource, and
use the second counter to measure the time spent performing actual operations and the time spent performing overhead operations.

13. The apparatus of claim 8, wherein the processing device converts a lock value block (LVB) of the cluster file system to a lock counter block (LCB) to count in both read lock mode and write lock mode.

14. The apparatus of claim 8, wherein the processing device is also to:
determine the number of nodes that are interested in the resource and a total queue length of all lock request queues on all nodes of the plurality of nodes,
determine an average queue length based on the number of nodes interested in the resource and the total queue length, and
adjust a time interval during which the node can hold the lock based on the average queue length.

15. A non-transitory computer-readable storage medium embodying instructions that, when executed by a processing device, will cause the processing device to perform a method comprising:
measuring, by the processing device, time spent performing actual operations by a node in a cluster file system while the node holds a lock on a resource;
measuring, by the processing device, time spent performing overhead operations by the node without synchronization of clocks across the cluster file system; and
determining, by the processing device, latency and throughput of the cluster file system based on the time spent performing actual operations and the time spent performing overhead operations.

16. The non-transitory computer-readable storage medium of claim 15, wherein the method further comprises:
tracking the number of nodes in the cluster file system that are interested in the resource.

17. The non-transitory computer-readable storage medium of claim 15, wherein measuring the time spent performing actual operations comprises:
starting a timer after a lock request from the node is granted and after initial cache filling has been completed; and
stopping the timer upon the node deciding to release the lock request, but before the lock request is actually released and before any overhead operations are executed.

18. The non-transitory computer-readable storage medium of claim 15, wherein the method further comprises:
increasing a time for which the node can keep a lock on the resource to adjust a ratio between the latency and throughput.

19. The non-transitory computer-readable storage medium of claim 15, wherein the method further comprises:
providing a first counter and a second counter, both the first and the second counters associated with the resource, wherein the first and the second counters can be updated regardless of a lock mode of the lock;
using the first counter to keep track of the number of nodes that are interested in the resource; and
using the second counter to measure the time spent performing actual operations and the time spent performing overhead operations.

20. The non-transitory computer-readable storage medium of claim 15, wherein the method further comprises:
converting a lock value block (LVB) of the cluster file system to a lock counter block (LCB) to count in both read lock mode and write lock mode.

21. The non-transitory computer-readable storage medium of claim 15, wherein the method further comprises:
determining the number of nodes that are interested in the resource and a total queue length of all lock request queues on all nodes of the plurality of nodes;
determining an average queue length based on the number of nodes interested in the resource and the total queue length; and
adjusting a time interval during which the node can hold the lock based on the average queue length.

* * * * *